US012117138B2

(12) United States Patent
Torstensson

(10) Patent No.: US 12,117,138 B2
(45) Date of Patent: Oct. 15, 2024

(54) BEAMSHAPING WAVEGUIDE FOR HEADLIGHTS

(71) Applicant: Tyri International, Inc., Stevens Point, WI (US)

(72) Inventor: Per-Arne Torstensson, Gothenburg (SE)

(73) Assignee: Tyri International, Inc., Stevens Point, WI (US)

( * ) Notice: Subject to any disclaimer, the term of this patent is extended or adjusted under 35 U.S.C. 154(b) by 0 days.

(21) Appl. No.: 18/207,407

(22) Filed: Jun. 8, 2023

(65) Prior Publication Data

US 2023/0324022 A1 Oct. 12, 2023

Related U.S. Application Data

(60) Provisional application No. 63/352,108, filed on Jun. 14, 2022.

(51) Int. Cl.

| | |
|---|---|
| ***F21S 41/24*** | (2018.01) |
| ***F21S 41/143*** | (2018.01) |
| ***F21S 41/27*** | (2018.01) |
| ***F21W 102/13*** | (2018.01) |

(52) U.S. Cl.

CPC ............. *F21S 41/24* (2018.01); *F21S 41/143* (2018.01); *F21S 41/27* (2018.01); *F21W 2102/13* (2018.01)

(58) Field of Classification Search

CPC ........ F21S 41/322; F21S 41/663; F21S 41/24; F21S 41/151; F21S 41/153; F21S 41/143; F21S 41/26; F21S 41/285; F21S 43/239; F21S 43/241; F21S 41/27; F21W 2102/13; G02B 6/0036; G02B 6/001; G02B 6/002; G02B 6/0023; G02B 6/0033; G02B 6/0035; G02B 6/0038; G02B 6/0045

See application file for complete search history.

(56) References Cited

U.S. PATENT DOCUMENTS

| | | | |
|---|---|---|---|
| 6,134,369 | A | 10/2000 | Kurosawa |
| 6,804,446 | B1 | 10/2004 | Nordin et al. |
| 7,611,272 | B2 | 11/2009 | Specht et al. |

(Continued)

FOREIGN PATENT DOCUMENTS

| | | | |
|---|---|---|---|
| CN | 209688723 | U | 11/2019 |
| CN | 109027955 | B | 10/2020 |

(Continued)

*Primary Examiner* — Erin Kryukova

(74) *Attorney, Agent, or Firm* — Wong Meyer Smith & McConnell

(57) ABSTRACT

A lighting system for vehicle includes an LED light source, at least one waveguide having at refracting surface array configured to shape light received from the LED light source into a light pattern, and a projection lens configured to receive the light pattern and project it outwardly from the vehicle. A first waveguide may shape light received from the LED light source into a low beam light pattern. A second waveguide may shape light received from the LED light source into a high beam light pattern. Generation of the high beam light pattern may include shaping light received from the LED light source through both the first and a second waveguides. The one or more waveguides may also include one or more protrusions extending from the body of the waveguide that further shape the emitted light pattern.

21 Claims, 10 Drawing Sheets

(56) References Cited

U.S. PATENT DOCUMENTS

| | | | | |
|---|---|---|---|---|
| 7,808,581 | B2 | 10/2010 | Panagotacos et al. | |
| 9,306,670 | B2 | 4/2016 | Fujiwara et al. | |
| 2012/0027344 | A1 | 2/2012 | Krijn et al. | |
| 2013/0021815 | A1* | 1/2013 | Koizumi | F21S 43/249 362/511 |
| 2015/0003094 | A1* | 1/2015 | Gebauer | G02B 6/002 362/511 |
| 2019/0154222 | A1* | 5/2019 | Iwasaki | F21S 41/663 |
| 2019/0179157 | A1* | 6/2019 | Kang | G02B 27/0955 |
| 2020/0041716 | A1* | 2/2020 | Sousek | F21S 43/40 |
| 2021/0310628 | A1* | 10/2021 | Li | F21S 41/285 |

FOREIGN PATENT DOCUMENTS

| | | | | |
|---|---|---|---|---|
| CN | 215675041 | U | 1/2022 | |
| DE | 102013212355 | A1 * | 12/2014 | F21S 43/239 |
| EP | 1903274 | A1 | 3/2008 | |
| EP | 2607774 | A2 * | 6/2013 | F21S 41/147 |
| EP | 2703852 | A1 | 3/2014 | |
| EP | 3489575 | A1 | 5/2019 | |
| FR | 2994747 | A1 * | 2/2014 | F21S 41/143 |
| FR | 3050010 | A1 * | 10/2017 | |
| JP | 2006337748 | A | 12/2006 | |
| JP | 2016212949 | A | 12/2016 | |
| WO | 2020064978 | A1 | 4/2020 | |
| WO | 2021121131 | A1 | 6/2021 | |

* cited by examiner

BEAMSHAPING WAVEGUIDE FOR HEADLIGHTS

CROSS-REFERENCE TO RELATED APPLICATION

This application claims the benefit of U.S. provisional patent application Ser. No. 63/352,108 filed Jun. 14, 2022, the entire disclosure of which is hereby incorporated by reference.

BACKGROUND AND SUMMARY

This invention relates to vehicle lights, and more particularly to a waveguide to form a beam pattern suitable for high beam and low beam vehicle headlights and work lights.

A vehicle is typically outfitted with a number of automotive lamps or lights that provide illumination in certain areas in and around the automobile. Certain lights may be mounted and configured to illuminate areas within the vehicle interior while other lights may be mounted and configured to illuminate areas exterior to the vehicle. Typically, the interior lights may illuminate areas that facilitate operator ingress or egress, or operation and control of the vehicle. The exterior lights may also facilitate operator ingress or egress, and may also be configured to illuminate other external areas. For example, exterior vehicle lights such as headlight and fog lights may provide forward illumination for lighting a path of travel, and rearward or side illumination for safety or providing an indication of a function, such as reverse indicator lights, directional indicators, taillights, and brake lights. In a work vehicle, exterior lights may also be provided for illuminating a work area, typically located forward of the cab of the work vehicle.

In the context of exterior vehicle lighting configured to provide forward illumination of the vehicle's path of travel while traveling in low light, dark areas or at night, vehicles often include a combination of both low beam and high beam headlights or headlamps. Low beams provide a relatively short-range illumination pattern as compared to high beams; and, their illumination pattern is angled towards the ground as to illuminate the roadway without adversely obscuring the field of vision of oncoming drivers. In contrast, high beams provide a long-range illumination pattern that are well suited for illuminating an area above and beyond that of the low beams, and are particularly well suited for roadways that lack street lighting or other overhead illumination.

In a conventional vehicle headlamp, as shown in the prior art system 10 of FIG. 14, in either of the low beam or high beam configuration a light bulb 12, such as a halogen bulb, may be located within a parabolic reflector 14. Light 16 emitted from the bulb 12 is predominantly collimated as it reflects outwardly off of the interior surface of the parabolic reflector 14. A front lens 18 then directs the emitted light 20 onto a portion of the roadway, corresponding to the desired illumination pattern of either the low beam or high beam.

Prior efforts have been made to improve upon system 10 and simplify the illumination of roadways. In such prior art embodiments, as shown in FIG. 15, the conventional parabolic reflector 14 has been replaced was a unitary reflector 22 formed of a plurality of interior mirrored surfaces arranged in a stepwise fashion. Such a reflector 22 both collimates a majority of the light emitted from the filament of the bulb, and simultaneously directs the emitted light 20 into the desired illumination pattern in the absence of a front lens 18. Such an improvement provides the benefit of omitting the front lens 18 from the vehicle headlamp assembly. However, all such prior embodiments continue to be limited in their ability to collimate and direct only the emitted light that contacts the reflector. That is to say that the light directed forward of the bulb, which does not contact the reflector 14, 22 is not collimated and as such may not be appropriately redirected to the desired location, regardless of the presence or absence of a front lens 18.

More recent developments in the improvement of bulb-based vehicle headlamps have seen the introduction of dual-beam headlights, as shown in the prior art system of FIG. 16, which incorporate both the low beam and the high beam into a single headlamp system. Such dual beam headlamps provide a single light bulb 12 or other light generator, with a greater candela than that of a traditional headlamp. The system may utilize an elliptical reflector 24 rather than parabolic reflector 12, 22, which rather than collimating emitted light 20, focuses the light 16 at a focal point 26 adjacent the front end of the reflector 24. A shaped shield 28 may be selectively extended at the focal point 26, via a solenoid 30, to alter the shape and brightness of light 16 that passed through the focal point 26 to a projector lens 18 that transmits the emitted light 20 onto the roadway. By way of selectively activating the shape shield 28, the prior art dual-beam system as shown in FIG. 16 can modulate between high beam and low beam operation, while utilizing a single common light bulb 12 and reflector 24. However, such conventional dual-beam systems continue to rely upon high-energy consumption and low-reliability halogen or xenon light bulbs. Compounded by the need for mechanical solenoid activation for modulation between low beam and high beam operation, such prior systems are susceptible to mechanical failures.

In lieu of bulb-based systems, alternative advancements in vehicle headlights have also included LED based systems. One form of LED based systems is a reflector headlight, in which an LED or array of LEDs illuminates a reflector formed of a plurality of interior mirrored surfaces arranged in a stepwise fashion, similar to the reflector 22 shown in FIG. 14. Yet other systems, commonly referred to as projector systems, combine an LED light source with a front lens, similar to lens 18 shown in FIG. 16, which may act to condense and/or redirect the light output from the reflector. In some prior art projection-based systems, the light beam output may be shaped in part by a surface upon which the LED is mounted, such that a portion of the light is inhibited from passing from the reflector to the lens. Still further, in LED projector systems that include dual light sources to provide both low beam and high beam illumination, i.e., bi-LED projector systems, the LEDs may be mounted on opposing surfaces with their respective reflectors abutting at a knife-edge that further defines the beam shape of light passing to the lens. Moreover, current LED-based headlight systems have become increasingly complicated in their combination of different reflectors for high/low beam and/or a combination of reflectors and separate projectors.

Accordingly, there exists a need for a vehicle headlamp product that provides a simplified solution for shaping and projecting the illumination pattern of both low beam and high beam lights without the use of unreliable and high-energy consuming bulbs, active mechanical components, or restrictive LED reflectors and projectors. There is also a need for a system that is physically smaller than other LED-based systems and can easily be modified to accommodate illumination standards for different countries.

The present invention contemplates an LED receiving waveguide with an integrated lens assembly to form a beam pattern suitable for high beam and/or low beam vehicle headlights and work lights.

The headlight assembly for a vehicle according to the present invention may be in the form of a light system for use with a vehicle. In one aspect, the light system may include at least one light emitting diode (LED) light source mounted to a vehicle that is configured to emit a light upon activation and at least one waveguide configured to receive the light emitted from the at least one LED light source at a first end and output a light pattern at an opposing second end. The at least one waveguide may have a refracting surface array disposed within a body of the waveguide, located between the first and second ends. The refracting surface array may be configured to shape the light received from the LED light source to form the light pattern at the second end of the waveguide, which is presented to a projection lens disposed adjected the second of the waveguide. The projection lens is configured to receive the light pattern and project the same in front of the vehicle towards a roadway. Generally, the waveguides of the present invention are configured to emit the light into a desired light pattern for use in vehicle headlights.

Specifically, then, one aspect of the present invention may include a first waveguide that is adapted to form a low beam light pattern at a headlight of the vehicle and a second waveguide adapted to form at least a portion of a high beam light pattern at the headlight of the vehicle.

Another aspect of the present invention may include a refracting surface array disposed within the corresponding waveguide that includes a void disposed within the body of the waveguide, a collector lens upstream of the void and a redistribution surface downstream of the void. The collector lens may be configured to asymmetrically distribute light about the refracting redistribution surfaces, and the redistribution surfaces may be configured to collimate the light received thereon.

In another aspect of the present invention the redistribution surface of the array may include a plurality of refracting surfaces of varying configurations and orientations as to redirect the light received thereon into an asymmetrical low beam or high beam light pattern.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
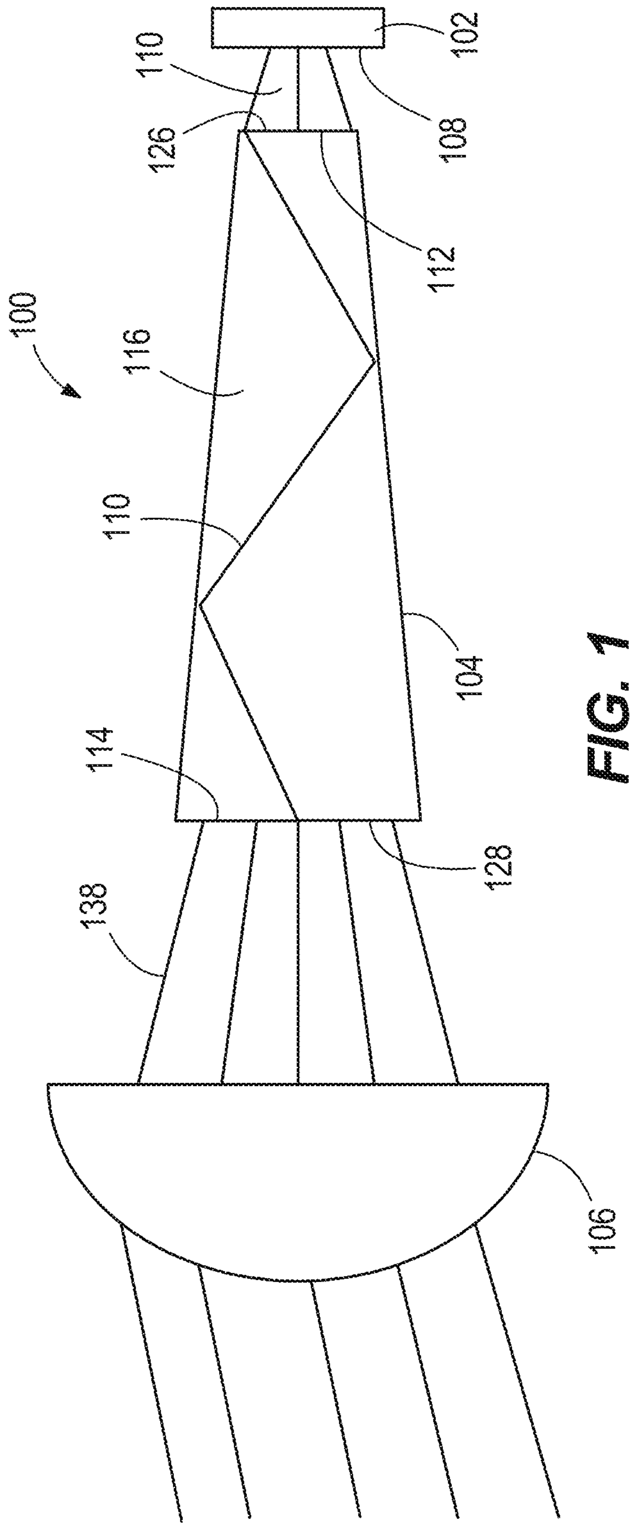
FIG. 1 is a side cross sectional view of the vehicle headlight system according to one embodiment of the present invention.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring to the following description in which like reference numerals represent like parts throughout the disclosure, turning now to FIGS. 1-4, and initially FIG. 1, the vehicle lighting system 100 according to one embodiment of the present invention includes a LED light source 102, a waveguide 104, and a projection lens 106. The LED light source 102 may be a single light emitting diode (LED) or an array of LEDs arranged in a planar configuration. A state-of-the-art automotive LED array, for instance, may have a total emitting surface in the range of 0.5-5.0 $mm^2$. As opposed to conventional halogen or xenon vehicle headlamp bulbs 12, the emitting surface 108 of the LED light source 102 is a flat, i.e., two-dimensional, surface emitter 108, which emits light 110 predominantly in a forward-facing direction as opposed to about an arcuate surface of a curved bulb. Accordingly, the lack of light emissions about a curved or arcuate surface lessens the need for a conical reflector, such as the parabolic reflector 14, 22 or elliptical reflector 24 utilized in prior vehicle headlamps. Furthermore, each of the individual LED elements within the array may be individually supplied with a unique or even variable electrical current. This difference in electrical current supplied to LEDs within the array provides greater control over how much light is emitted from each LED, thereby providing another degree of control over the intensity of the emitted light 110. Still further, it should be understood that the present invention is well suited for use with all forms of LED elements, including but not limited to white LEDs that emit white light through the use of a blue LED excited phosphor, and laser diodes that provide a higher intensity illumination through the use of a blue laser excited phosphor.

Turning now to the waveguide 104, the waveguide 104 extends from a first end 112 that is configured to receive input light 110 emitted from the LED light source 102 to an opposing second end 114 that is configured to output light 110 to the projection lens 106. The body 116 of the waveguide 104 extends along a longitudinal axis from the first end 112 to the opposing second end 114 and generally defines a pathway through which the light 110 travels towards the second end 114. The wave guide 104 may be formed of a highly transparent polymer material, for example polycarbonate (PC) or polymethyl methacrylate (PMMA), with a typical refractive index of 1.35-1.65, which is well suited for the internal reflection of light traveling from first end 102 to the second end 112. In an alternative embodiment of the present invention, the wave guide 104 may also be formed of glass.

Figure 2:
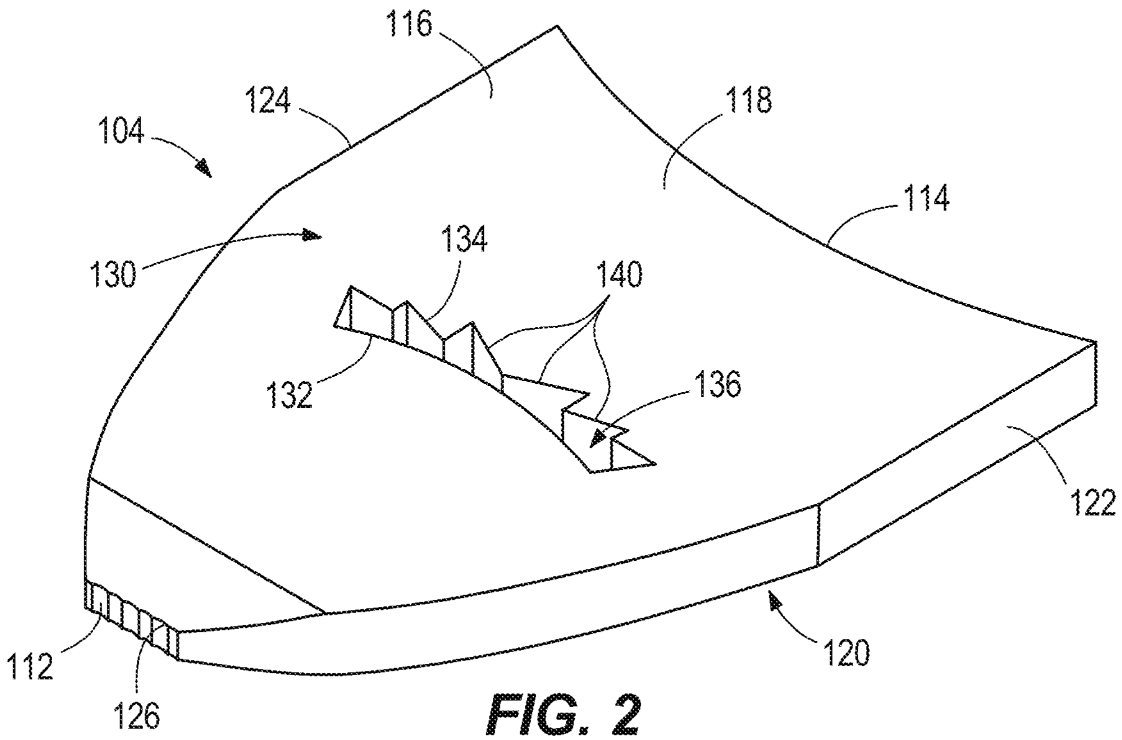
FIG. 2 is a rear top perspective view of a waveguide according to one embodiment of present invention configured for use in a vehicle headlight.
Figure 3:
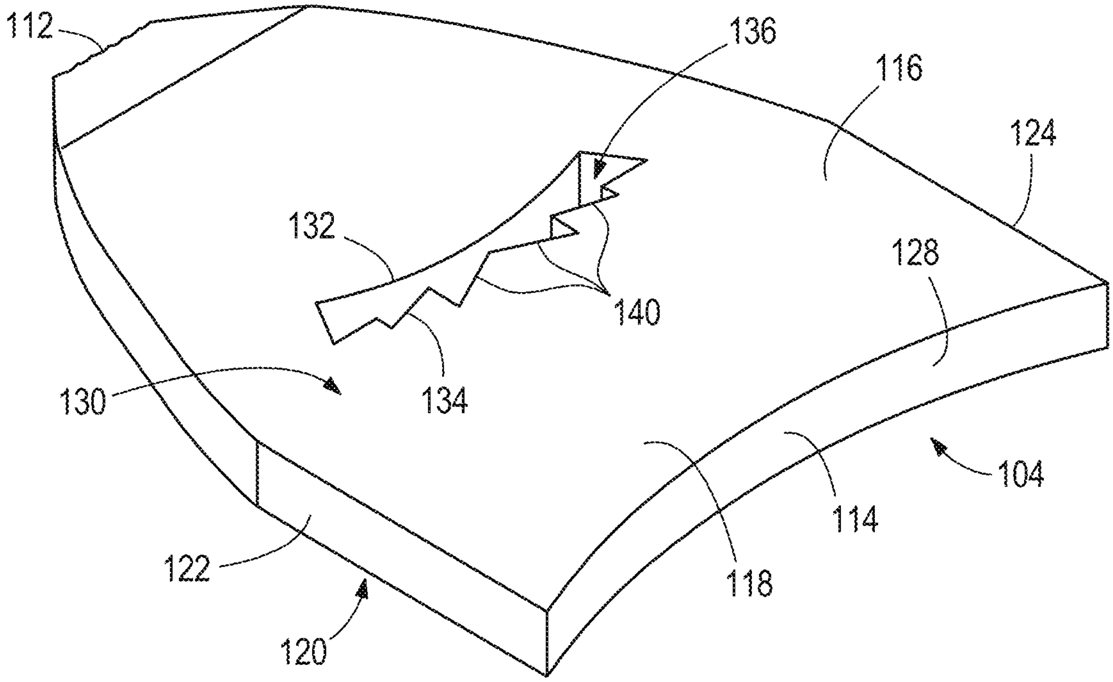
FIG. 3 is a front top perspective view of the waveguide shown in FIG. 5.
Figure 5:
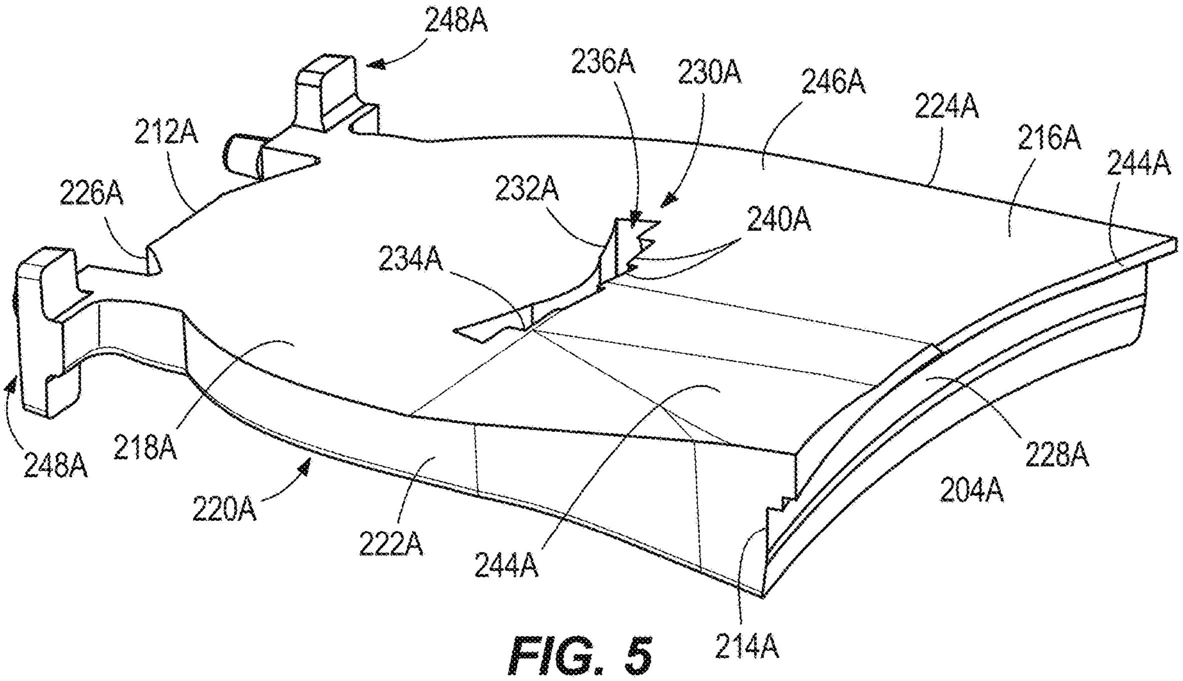
FIG. 5 is a front top perspective view of a low beam waveguide according to one embodiment of present invention configured for use in a vehicle headlight.
Figure 6:
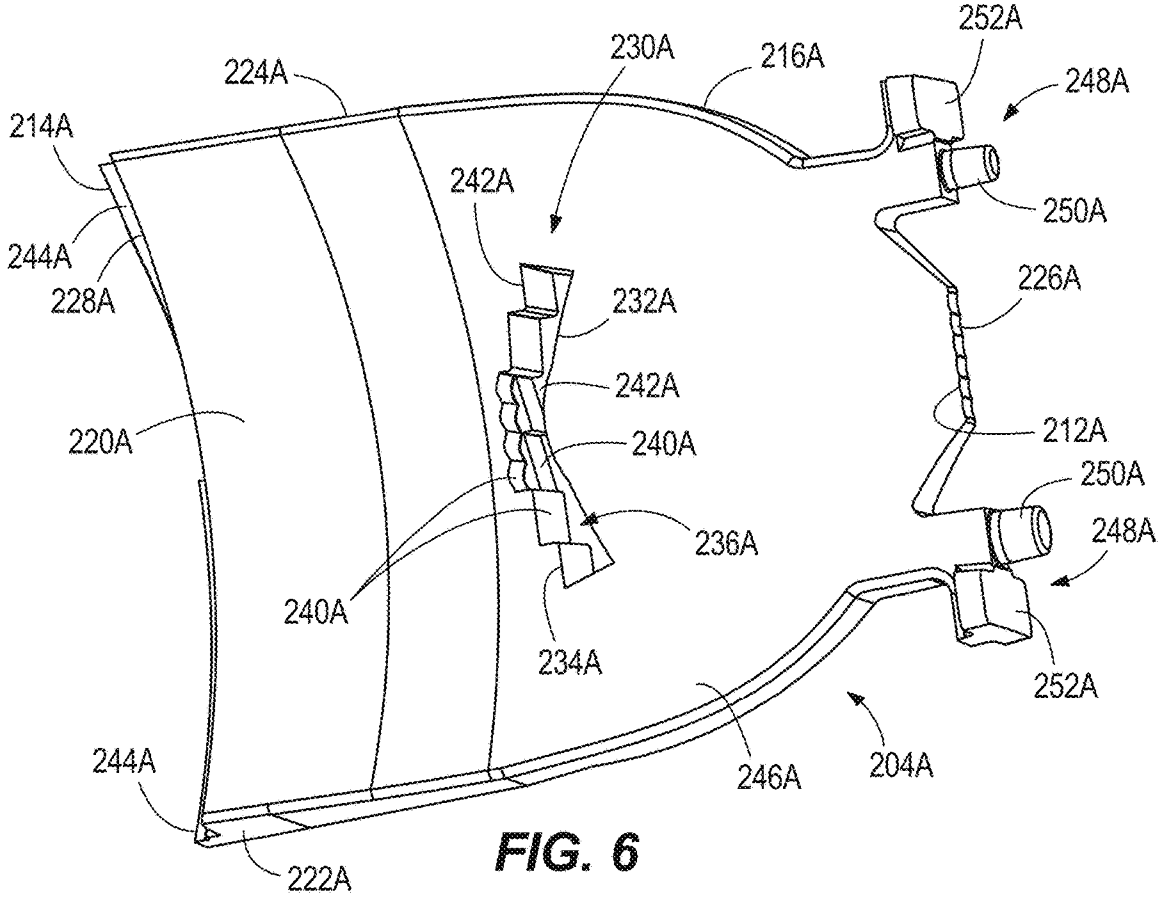
FIG. 6 is a bottom perspective view of the low beam waveguide shown in FIG. 5.

Turning now to FIGS. 5 and 6, in which a detailed embodiment of the waveguide 104 according to one embodiment of the present invention is shown, the body 116 may further comprise a top 118, bottom 120, and right and left sides 122, 124. The waveguide 104 is generally a planar structure that may have a thickness of between 2.0 and 10.0 millimeters, and a length of between 10.0 and 100.0 millimeters. However, it should be understood that any combination or variation of thickness and length within the ranges provided, and selected to provide the desired shaping of the emitted light 110 as will be described in further detail below, are well within the scope of the present invention. As shown in FIGS. 1-3, the right and left sides 122, 124 of the waveguide 104 are not parallel, but rather flared outwardly from the first end 112 towards the opposing second end 114 such that the waveguide 104 may form a general "V" shape, having a second end 114 of greater length than the first end 112, while simultaneously maintaining internal reflection and/or total internal reflection of the light traveling through the body 116 until being emitted from the second end 114. Furthermore, the thickness of the waveguide 104 may also increase from the first end 112 towards the second end 114. As described in further detail below, variation in the width and thickness of the waveguide 104 along the length of the body 116 in order to achieve a desired shaping of the emitted light 110 is well within the scope of the present invention.

Still referring to the waveguide 104, the first end 112 defines an input surface 126 that is configured to receive light 110 from the LED light source 102. The input surface 126 may be configured to physically contact or nearly about the surface emitter 108 of the LED light source 102, as to direct a greater portion of the emitted light 110 into the waveguide 104. Once received at the input surface 126, the light transmits through the body 116 of the waveguide 104 towards the output surface 128 disposed about the second end 114. While traveling through the body 116 of the waveguide 14, all or most of the light may reflect off of the top 118, bottom 120, and right and left sides 124, 126, wherein each surface 118, 120, 124 and 126 plays a part in shaping the beam and are properly configured and oriented to do so. Given that the atmosphere surrounding the waveguide 104 is a less optically dense material, i.e., one with a lower refractive index than that of the waveguide 104, when the angles of incidence are larger than the critical angle, as defined by Snell's law, total internal reflection will occur such that a reflective or partially reflective coating need not be applied to the outer surfaces of the waveguide 104 in order to reflect light across its internal body 116 towards the output surface 128.

Still referring to the waveguide 104, as shown in FIGS. 2 and 3, positioned within the body 116 of the waveguide 104 is a lens assembly 130. The lens assembly 130 may comprise both a collector lens 132 and redistributor surface 134 disposed on opposing sides of a void 136 located within the body 116. In combination, the lens assembly 130 is configured to shape the light 110 into a desired light output pattern 138 that is emitted from the output surface 128, a representation of which is shown in FIG. 4A-4D. The lens assembly 130 furthermore may form relative areas of higher and lower light intensity within the desired output pattern 138. That is to say that the lens assembly 130 both shapes the configuration and asymmetrically or variably alters the intensity of light within the output light pattern 138. More specifically, the collector lens 132 is configured to collimate and collect the light 110 as it travels along the longitudinal plane of the waveguide 104. Once collected and collimated, the light 110 travels across the void 136 where it is then received by redistribution surface 134. As shown in FIGS. 2, 3, 5 and 6, the redistribution surface 134 may include a plurality of linear portions or planar segments 140 of refracting surfaces. The respective length, thickness, surface area, and orientation along both the transverse and fontal planes, i.e., perpendicular to the longitudinal axis of the waveguide 104, of each individual segment 140 of the redistribution surface 134 alters the resultant shape of the desired light output pattern 138 that is emitted from the output surface 128. Furthermore, the asymmetrical amount of light provided to each segment 140, as a function of one or more parameters of the collector lens 132, e.g., focal length, may further impact the relative intensity of light within given portions of the light output pattern 138.

Turning now to the projector lens 106 of the vehicle lighting system 100, as shown in FIG. 1, the projector lens is configured to receive the light output pattern 138 from the output surface 128 located at the second end 114 of the waveguide 104. The light output pattern 138, which may be either a low beam or high beam pattern, is projected outwardly and downwardly onto the roadway through the projection lens 106. As a result of the compact LED light source 102, which may include one or more LEDs positioned on a printed circuit board (PCB), and a waveguide 104 having a length of between typically 10 and 100 millimeters, the light output pattern 138 from the output surface 128 located at the second end 114 of the waveguide 104 is narrowly contained. Accordingly, the lens diameter of the projector lens 106 can be reduced to a distance of between 10.0 and 100.0 millimeters with a focal length also of between 10.0 and 100.0 millimeters. In totality, the relatively small diameter projection lens 106, combined with a thin LED light source 102 and relatively short waveguide 104, results in a vehicle lighting system 100 that is substantially more compact than a traditional vehicle light that utilized a halogen bulb 12 and reflector 14, 22, 24.

Furthermore, the relatively minimal thickness of the waveguide 104, of between 1.0 and 10.0 millimeters, allows for the compact stacking of multiple waveguides 104 within an alternative embodiment of the present invention. More specifically, in one alternative embodiment of the vehicle lighting system 200 according to the present invention, as shown in FIGS. 7A-13, the system 200 may comprise a first waveguide 200A and a second waveguide 200B that is utilized in combination with either a common or discrete LED light source 202 and a common projection lens 206. In the following description it should be understood that system 200 is generally similar to the previously described system 100, and that like features are identified by like reference characters that have been increased to begin with the number "2" in the hundreds place, but for the primary substitution of the waveguide 104 with the first waveguide 204A and a second waveguide 200B.

Figure 4A:
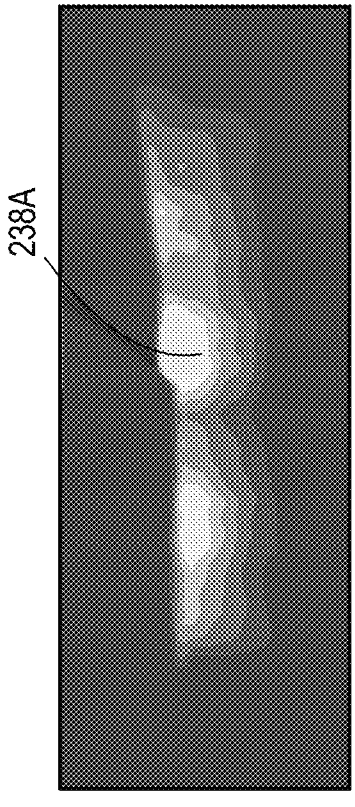
FIG. 4A is a front elevation view of a light emission profile from a low beam headlight according to one embodiment of the present invention.
Figure 4B:
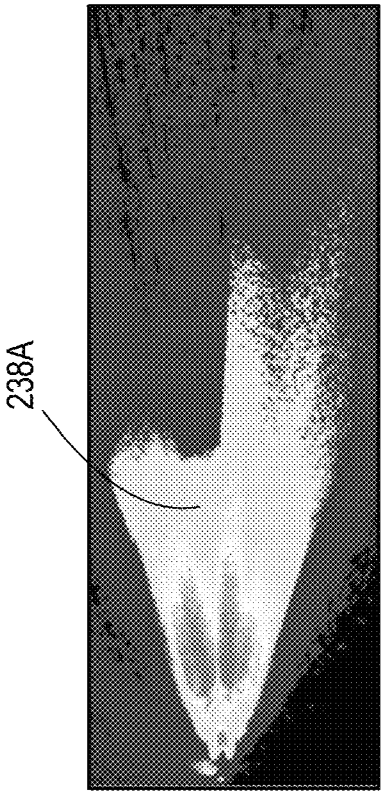
FIG. 4B is a top plan view of a light emission profile from the low beam headlight of FIG. 4A.
Figure 4C:
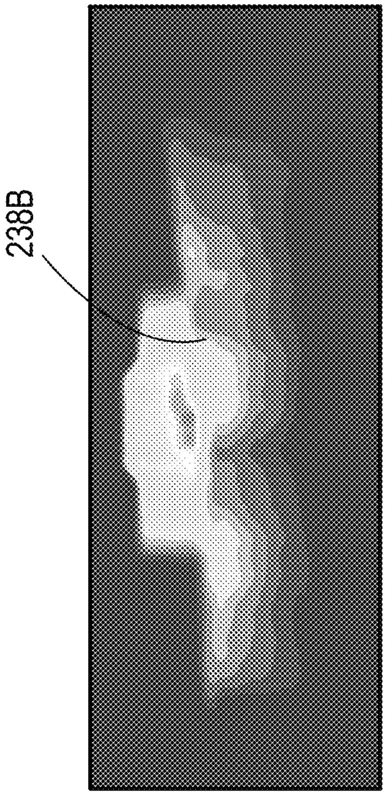
FIG. 4C is a front elevation view of a light emission profile from a high beam headlight according to one embodiment of the present invention.
Figure 4D:
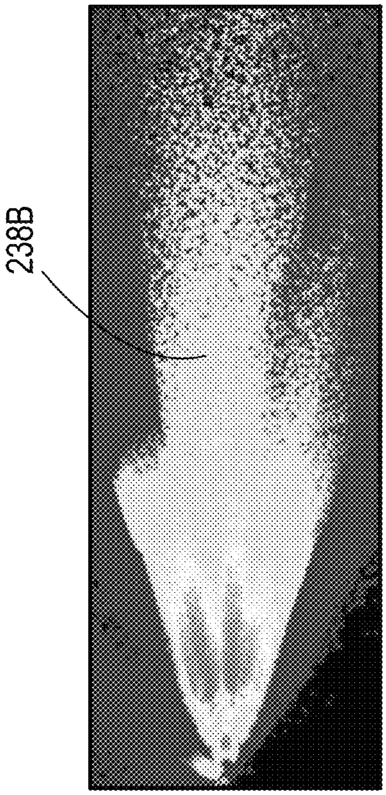
FIG. 4D is a top plan view of a light emission profile from the high beam headlight of FIG. 4C.

In system 200 the first waveguide 200A may be configured to emit a first light pattern 238A that corresponds to a low beam light pattern and a second waveguide 204B may be configured to emit a second light pattern 238B that corresponds to a high beam light pattern. More specifically, as was described above, the lens assembly 230 disposed within the respective waveguide 214A, 214B is configured to shape the light 210 into desired light output patterns 238A, 238B that are emitted from the corresponding output surfaces 228A, 228B. A representation of the corresponding light output patterns 238A, 238B of system 200 is shown in FIG. 4A-4D in which the profile of the first light pattern 238A may be controlled as to conform to regulatory requirements through the shaping of the respective waveguide 204A. More specifically, a first light pattern 238A may selectively reduce illumination of the left side of a vehicle driver's field of view at a distance greater than approximately 30 meters from the vehicle as to lessen illumination of the oncoming traffic across a roadway centerline, as shown in FIG. 4B. Similarly, as shown in FIGS. 4C and 4D, the profile of the second light pattern 238B may be controlled as to conform to regulatory requirements through the shaping of the respective waveguide 204B. More specifically, a second light pattern 238B, which is a high beam light pattern that respectively incorporates the first light pattern 238A therein, may provide additional illumination at an elevated height above the roadway at a distance from the vehicle greater than 30 meters, while selectively tapering the high beam illumination of both the left and right side of a vehicle driver's field of view at a distance greater than approximately 30 meters from the vehicle as to focus high beam illumination on the area ahead of the vehicle as shown in FIGS. 4C and 4D.

Still referring to FIGS. 4A-13, and more specifically FIGS. 5-8, the first waveguide 204A is configured for use when generating vehicle low beam lighting, while the second waveguide 204B is configured for use, either independently or in combination with the first waveguide 204B, when generating vehicle high beam lighting. The first waveguide 204A contains the features as were described above in the description of waveguide 104, including a first end 212A that is configured to receive input light 210 emitted from the LED light source 202 to an opposing second end 214A that is configured to output light 210A in the form of the light pattern 238A from a second end 214A to a projection lens 206. The body 216A of the waveguide 204A extends along a longitudinal axis from the first end 212A to the opposing second end 214A and generally defines a pathway through which the light 210 travels towards the second end 214A. The body 216A may further comprise a top 218A, bottom 220A, and right and left sides 222A, 224A. The first end 212A defines an input surface 226A that is configured to receive light 210 from the LED light source 202. The input surface 226A may be configured to physically contact or nearly abut the surface emitter 208 of the LED light source 202, as to direct a greater portion of the emitted light 210 into the waveguide 204A. Positioned within the body 216A of the waveguide 204A is a lens assembly 230A. The lens assembly 230A may comprise both a collector lens 232A and a redistributor surface 234A disposed on opposing sides of a void 236A located within the body 216A, as was described in the preceding discussion of system 100.

Still further, in one embodiment of the present invention, as shown in FIGS. 5-8, the first light pattern 238A may be further modified by the redistribution surface 234A comprised of a plurality of linear portions or planar segments 240A. More specifically, segments 240A may have a height less than that of the body 216A, such that one or more discrete rows 242A of segments 240A may be incorporated into the redistribution surface 234A in the lens assembly 230A. That is to say that a segment 240A of the redistribution surface 234A need not extend the full width of the body 216A of the waveguide 204A. For example, as seen in FIG. 6, the segments 240A may have a thickness or depth less than that of the body 216A, such that multiple segments 240A are stacked atop one another as to provide for yet further customization of the first light pattern 238A about its vertical axis as it is output from the waveguide 204A. As described above, such customization of the output light pattern 238A is particularly significant in the context of compliance with applicable vehicle safety regulations.

Figure 7:
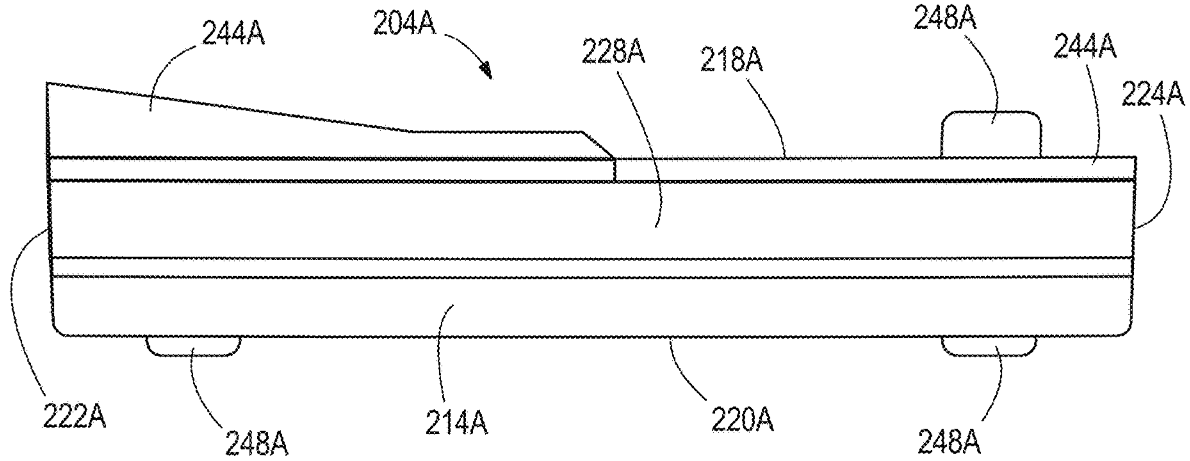
FIG. 7 is a front elevation view of the low beam waveguide shown in FIG. 5.

Furthermore, as is shown in FIGS. 5-7, it should be noted that the first waveguide 204A has a width greater than that of the second waveguide 204B. The increase in relative width of the first waveguide 204A corresponds to its relatively larger light output surface 228A at the second end 214A, opposite the LED light source 202. The increase in the light output surface 228A correlates to the wider area of roadway illumination exhibited by the vehicle's corresponding low beam or first light pattern 238A, as shown in FIG. 4B and discussed above.

In addition to its relatively greater width, first waveguide 204A, as shown in FIGS. 5 and 7, may also exhibit one or more asymmetrical extensions or protrusions 244A about the outer surface 246A of any one or more of its relative sides 218A, 220A, 222A, 224A and/or output surface 228A. By way of nonlimiting example, the low beam waveguide 204A may include a bulbous projection or protrusion 244A of its outer surface 246A positioned along the top 218A adjacent a side 220A, which corresponds to a medial portion of the low beam or first light pattern 238A for a system 200 mounted in a left headlamp position. The protrusion 244A generally exhibits an increase in thickness relative to the body 216A first waveguide 204A. Resultantly, the corresponding low beam light output pattern 238A may have greater height towards its medial portion, and relatively less height along its opposing perimeters or distal portion. In another nonlimiting embodiment, the first waveguide 204A may also include a protrusion 244A extending along a top edge of the second end 214A at the light output surface 228A, generally in the configuration of a shroud as shown in FIGS. 5 and 6.

In addition to the protrusions 244A present about the second end 214A, the first waveguide 204A may further include one or more mounting extensions 248A extending outwardly from opposing first end 212A as to allow the first waveguide 204A to be securely fastened to the LED light source 202, as will be described in further detail below. In one non-limiting embodiment the mounting extensions 248A generally include pegs 250A configured to be received within apertures of mounting surface upon which the LED light source 202 is positioned, and/or feet 252A configured to engage the mounting surface upon which the LED light source 202 is positioned. As shown in FIG. 6, the opposing pegs 250A may have different circumferences, as to allow the first waveguide 204A to be properly indexed, i.e., ensure that the top 218A is positioned upwardly, during assembly of the system 200.

Figure 8:
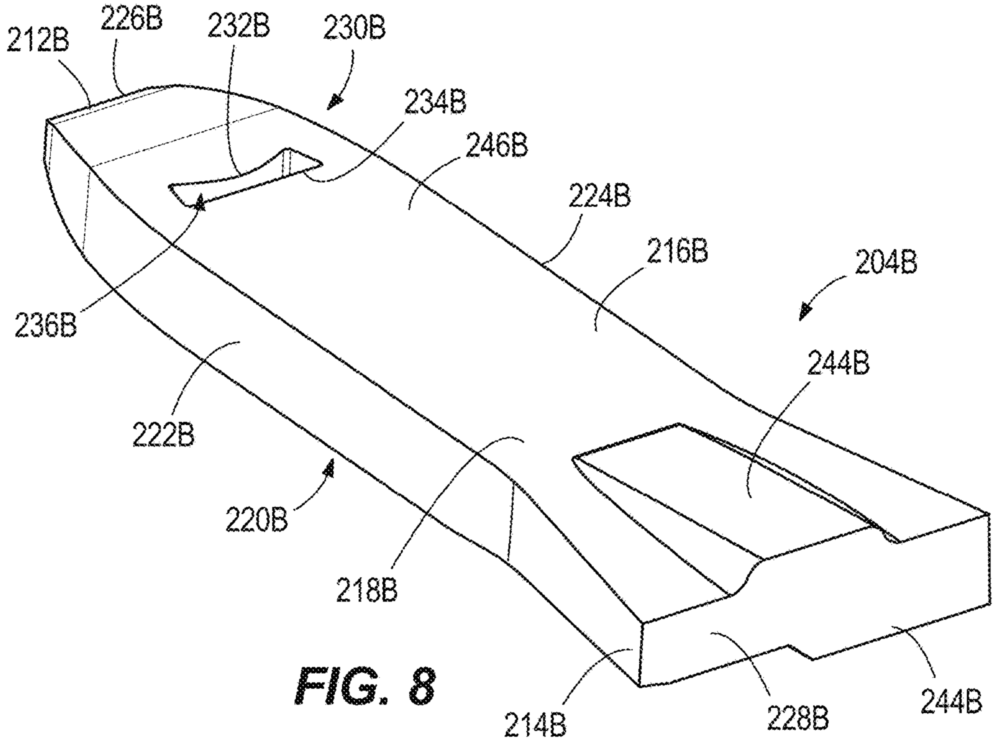
FIG. 8 is a front top perspective view of a high beam waveguide according to one embodiment of present invention configured for use in a vehicle headlight.
Figure 9:
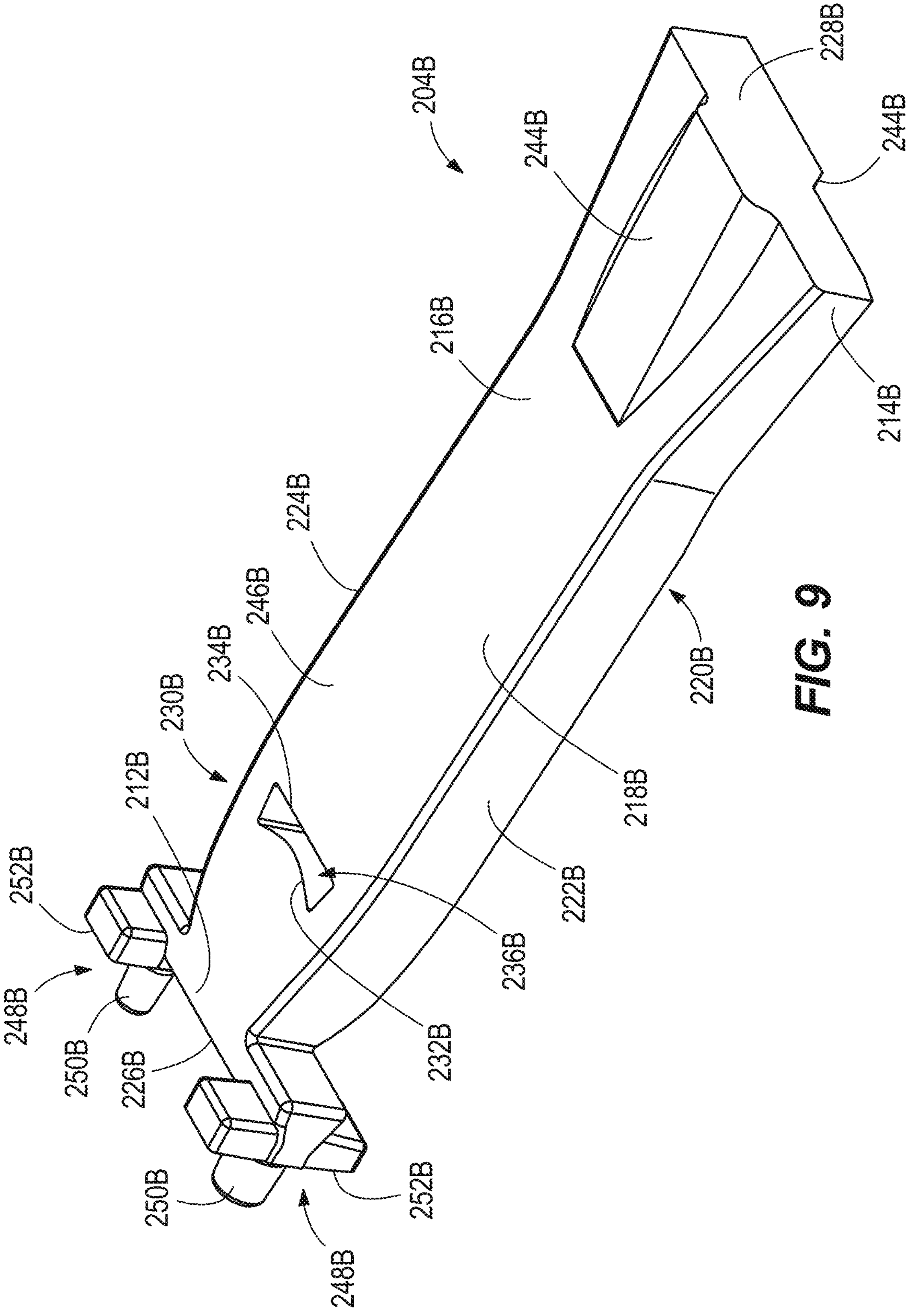
FIG. 9 is a front top perspective view of the beam waveguide as shown in FIG. 8 including mounting structures.
Figure 10:
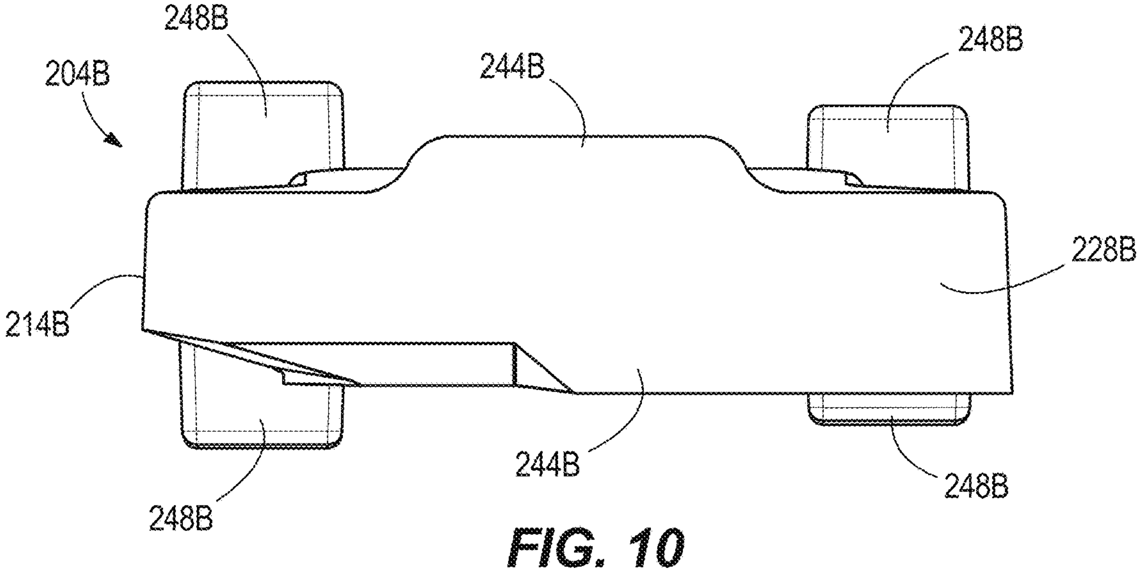
FIG. 10 is a front elevation view of the high beam waveguide shown in FIG. 9.

Turning now to FIGS. 8-10, the second waveguide 204B of system 200 is shown in isolation, and described in further detail below. As was described, the second waveguide 200B may be configured to emit a second light pattern 238B that corresponds to a high beam light pattern in system 200. More specifically, the lens assembly 230B disposed within the second waveguide 214B is configured to shape the light 210 into a desired light output pattern 238B that is emitted from the corresponding output surface 228B. A representation of the corresponding light output patterns 238B of the second waveguide 204B is shown in FIGS. 4C and 4D in which the profile of the second light output pattern 238B may be controlled as to conform to regulatory requirements through the shaping of the respective waveguide 204B. More specifically, the second light pattern 238B, which is a high beam light pattern that respectively incorporates the first light pattern 238A therein, may provide additional illumination at an elevated height above the roadway a distance from the vehicle greater than 30 meters, while selectively tapering the high beam illumination of both the left and right side of a vehicle driver's field of view at a distance greater than approximately 30 meters from the vehicle as to focus high beam illumination on the area ahead of the vehicle as shown in FIGS. 4C and 4D.

Still referring to FIGS. 4A-13, and more specifically FIGS. 8-10, the second waveguide 204B is configured for use when generating vehicle high beam lighting, either independently or in combination with the first waveguide 204A. The second waveguide 204B generally contains the features as were described above in the description of waveguide 104, and first waveguide 204A, including a first end 212B that is configured to receive input light 210 emitted from the LED light source 202 to an opposing second end 214B that is configured to output light 210B in the form of the light pattern 238B from a second end 214B to a projection lens 206. The body 216B of the waveguide 204B extends along a longitudinal axis from the first end 212B to the opposing second end 214B and generally defines a pathway through which the light 210 travels towards the second end 214B. The body 216B may further comprise a top 218B, bottom 220B, and right and left sides 222B, 224B. The first end 212B defines an input surface 226B that is configured to receive light 210 from the LED light source 202. The input surface 226B may be configured to physically contact or nearly abut the surface emitter 208 of the LED light source 202, as to direct a greater portion of the emitted light 210 into the waveguide 204B. Positioned within the body 216B of the waveguide 204B is a lens assembly 230B. The lens assembly 230B may comprise both a collector lens 232B and redistributor surface 234B disposed on opposing sides of a void 236B located within the body 216B, as was described previously.

Still further, in one embodiment of the present invention, not shown, it should be understood that the second light pattern 238B may be further modified by the redistribution surface 234B comprised of a plurality of linear portions or planar segments, and more specifically segments that have a height less than that of the body, such that one or more discrete rows of segments may be incorporated into the redistribution surface 234B in the lens assembly 230B. That is to say that a given segment of the redistribution surface 234B need not extend the full width of the body 216B of the waveguide 204B. For example, the segments may have a thickness or depth less than that of the body 216B, such that multiple segments are stacked atop one another as to provide for yet further customization of the second light pattern 238B about its vertical axis as it is output from the waveguide 204B.

Furthermore, as is shown in FIGS. 8-10, it should be noted that in contrast to the first waveguide 204A, the second waveguide 204B has a relatively shorter width than that of the width of low beam waveguide 204A. The relative decrease in the width of the high beam or second waveguide 204B, as shown in FIGS. 8-10, correlates to its relatively smaller light output surface 228B at its corresponding second end 214B, opposite the LED light source 202. This relative decrease in the light output surface 228B of the second waveguide 204B correlates to the narrower area of roadway and/or surrounding illumination exhibited by the vehicle's corresponding high beam light pattern 238B, as shown in FIG. 4D.

In addition to its relatively narrower width, second waveguide 204B, as shown in FIGS. 8-10, may also exhibit one or more asymmetrical extensions or protrusions 244B about the outer surface 246B of any one or more of its relative sides 218B, 220B, 222B, 224B and/or output surface 228B. By way of nonlimiting example, the high beam waveguide 204B may include a bulbous projection or protrusion 244B of its outer surface 246B centrally positioned along the top 218B adjacent the output surface 228B, which corresponds to a central portion of the high beam or second light pattern 238B for a system 200 mounted in a left headlamp position. The protrusion 244B generally exhibits an increase in thickness relative to the body 216B of first waveguide 204B. Resultantly, the corresponding high beam light output pattern 238B may have greater height towards its central portion, and relatively less height along its opposing perimeters or distal portions. Additionally, in another nonlimiting embodiment, the second waveguide 204B may also include a protrusion 244B extending along the bottom 220B at a side 224B, which when mounted together with the first waveguide 204A, will form a mating with the protrusion 224A located on the top 218A of the first waveguide 204A.

In addition to the protrusions 244B present about the second end 214B, the second waveguide 204B may further include one or more mounting extensions 248B, as shown in FIGS. 9 and 10, extending outwardly from opposing first end 212B as to allow the second waveguide 204B to be securely fastened to the LED light source 202, as will be described in further detail below. In one non-limiting embodiment the mounting extensions 248B generally include pegs 250B configured to be received within apertures of mounting surface upon which the LED light source 202 is positioned, and/or feet 252B configured to engage the mounting surface upon which the LED light source 202 is positioned. As shown in FIG. 9, the opposing pegs 250B may have different diameters or shapes as to allow the second waveguide 204B to be properly indexed, i.e., ensure that the top 218B is positioned upwardly, during assembly of the system 200.

Figure 11:
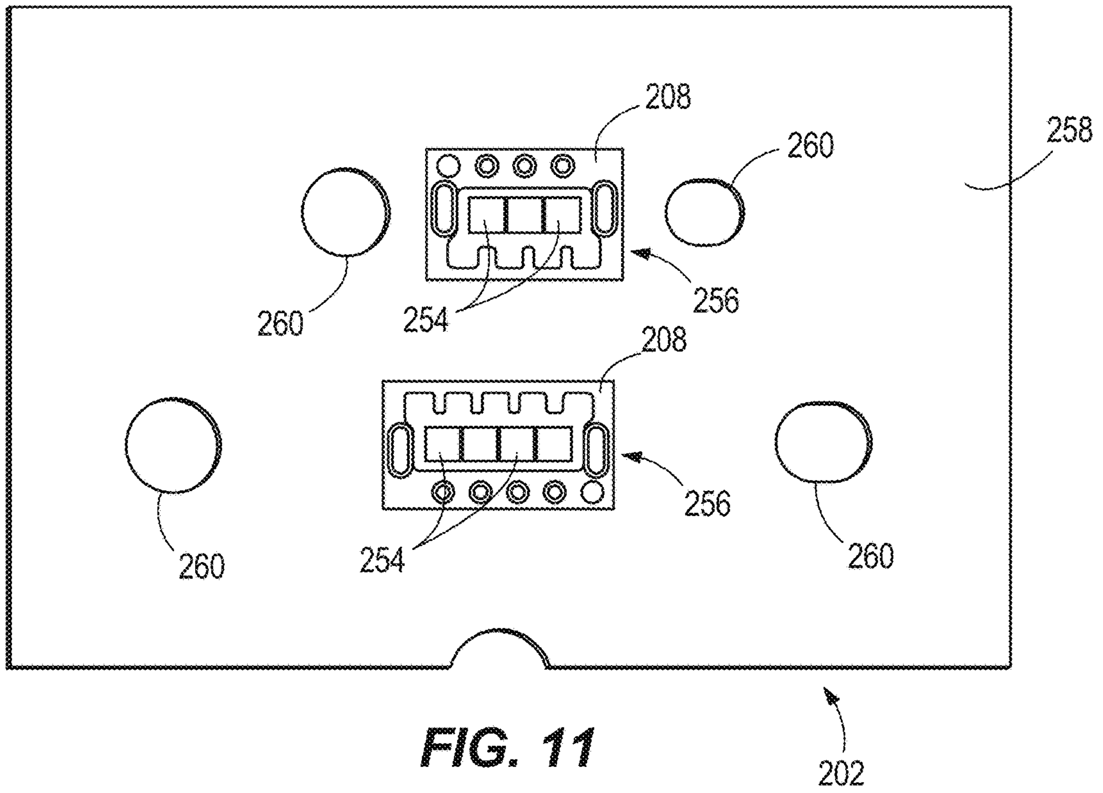
FIG. 11 is a front elevation view of a low beam and a high beam LED array affixed to a mounting surface configured to receive the low beam waveguide of FIG. 8 and the high beam waveguide of FIG. 9.
Figure 12:
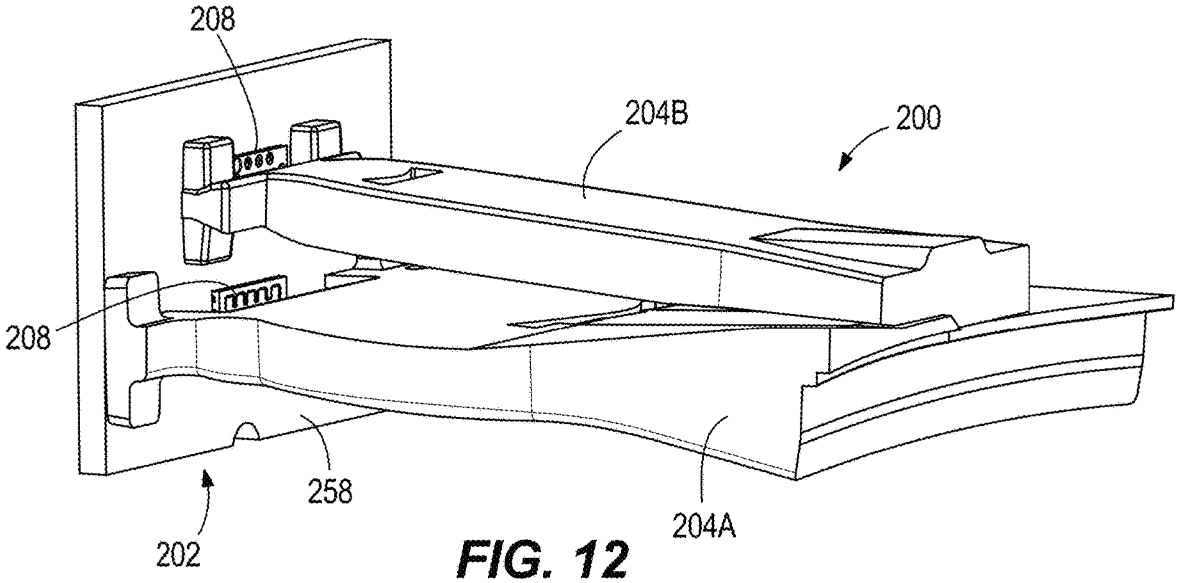
FIG. 12 is a front top perspective view of a vehicle headlight assembly according to one embodiment of the present invention, including a low beam waveguide, high beam waveguide and corresponding LED arrays.
Figure 13:
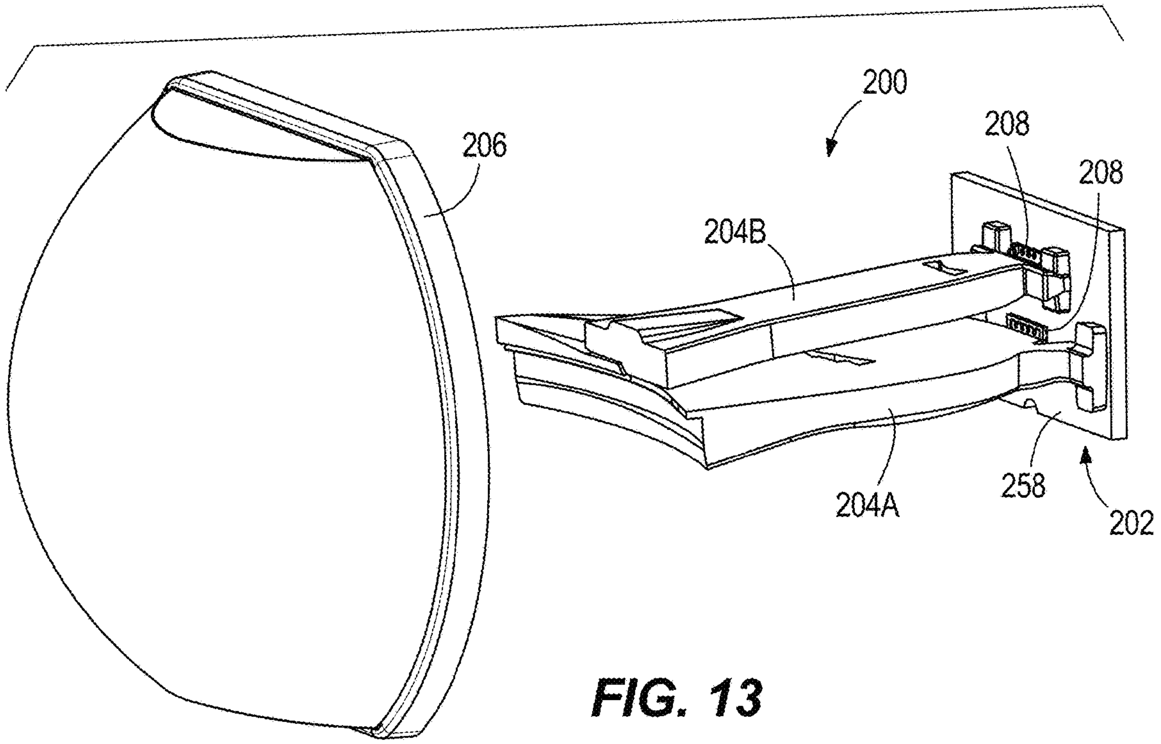
FIG. 13 is an alternative front perspective view of the assembly of FIG. 15, including a projection lens.
Figure 14:
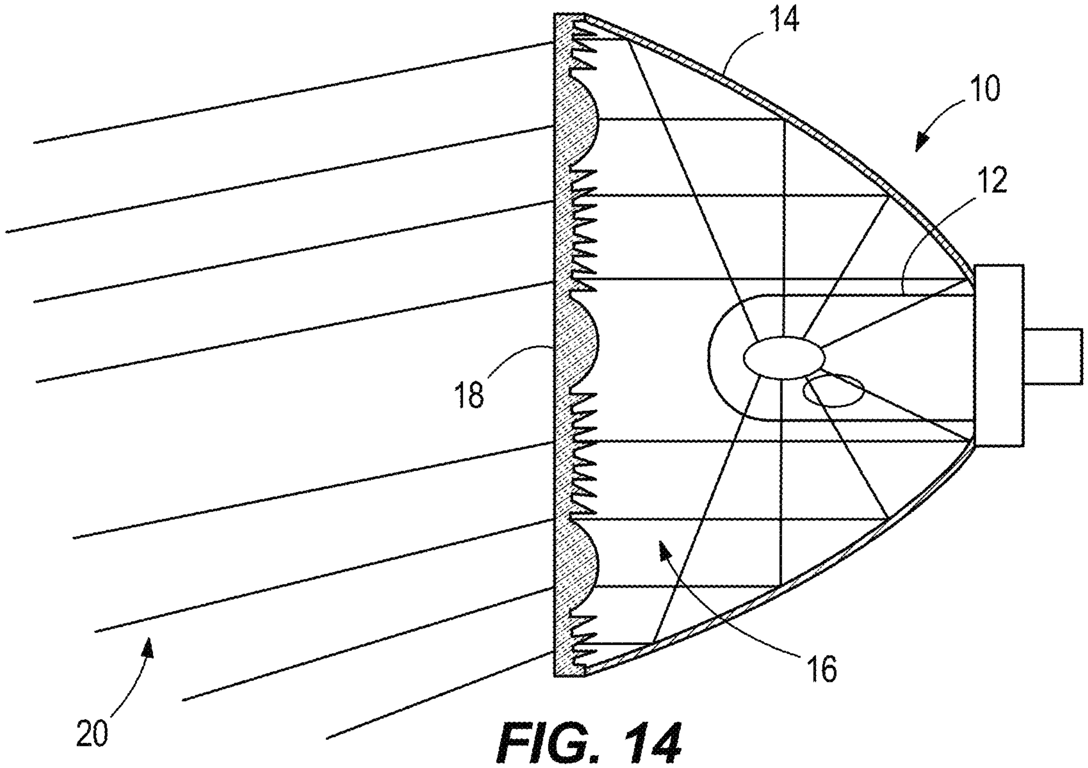
FIG. 14 PRIOR ART
FIG. 14 is a side cross-sectional view of a vehicle headlamp system according to the prior art.
Figure 15:
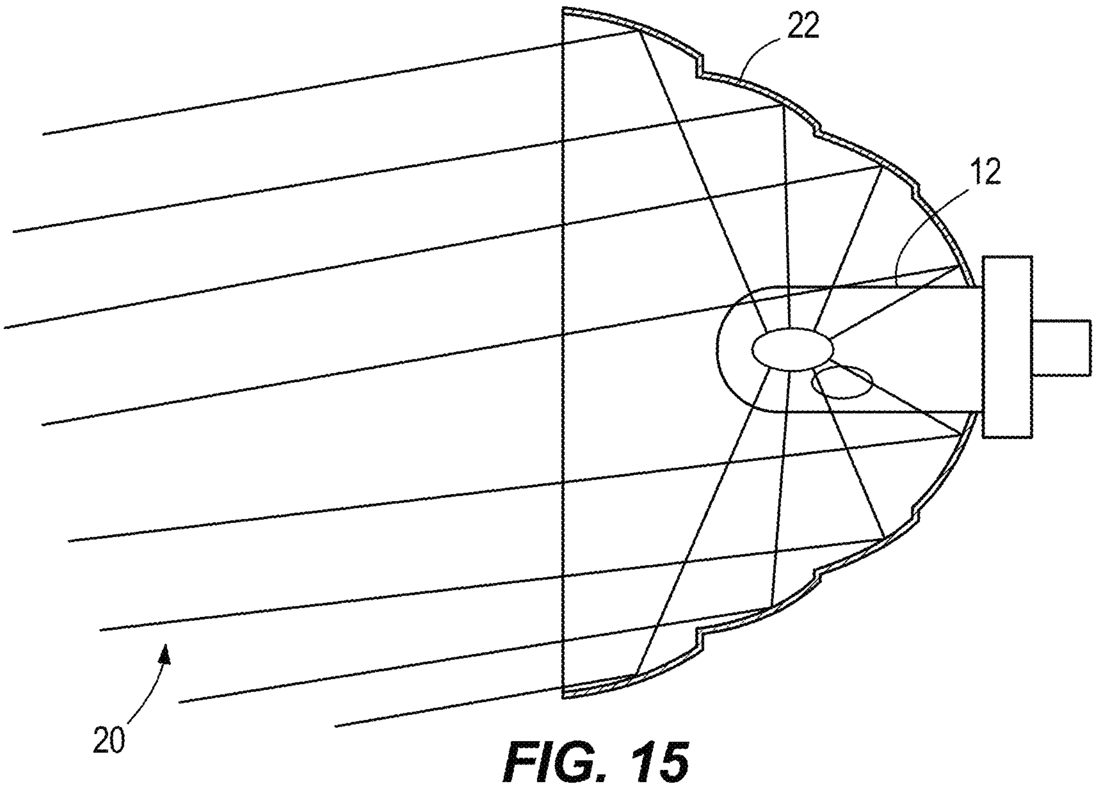
FIG. 15 PRIOR ART
FIG. 15 is a side cross-sectional view of an alternative embodiment of a vehicle headlamp system according to the prior art; and, FIG. 16 is a side cross-sectional view of a second alternative embodiment of a vehicle headlamp system according to the prior art.
Figure 16:
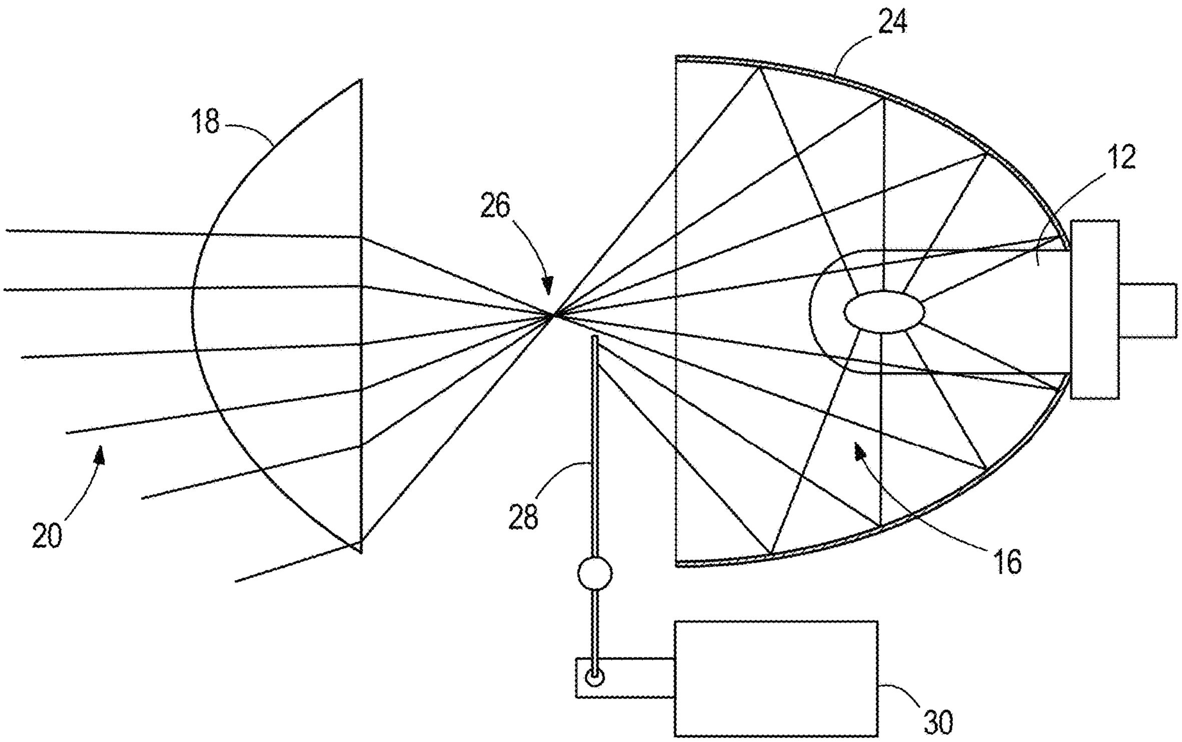
FIG. 16 PRIOR ART

Referring now to FIGS. 11-13, and initially FIG. 11, the LED light source 202 of system 200 is shown and described in further detail below. The LED light source 202, according to one embodiment of the present invention includes a light emitting surfaces 208 associated with each of the input surfaces 226A, 226B of the first and second waveguide 204A, 204B, respectively. The light emitting surfaces 208 may include one or more individual LEDs 254 or an array 256 thereof. By way of the non-limiting example shown in FIG. 11, the light emitting surface 208 corresponding the input surface 226A of the first waveguide 204A may include an array 256 of four individual LEDs 254, while the light emitting surface 208 corresponding the input surface 226B of the second waveguide 204B may include an array 256 of three individual LEDs 254. The LED light source 202 further comprises a mounting surface or plate 258 upon which the light emitting surfaces 208 are secured, and apertures 260 disposed therein are configured to receive the pegs 250A, 25B for mounting the waveguides 204A, 204B to the LED light source 202. More specifically, the apertures 260 may have different diameters or shapes as to allow the first and second waveguides, 204A, 204B to be properly indexed, i.e., positioned and orientated, during assembly of the system 200.

As shown in FIGS. 12 and 13 the combination of waveguides 204A and 204B may include additional structural components for further altering both the shape and/or intensity of the light emitted from the system 200. In addition to the protrusions 244A, 244B, the top surface 218A of the first waveguide 204A and the bottom surface 220B of the second waveguide 204B may exhibit complementary irregular or asymmetrical surfaces that are configured to mate and/or align when the second waveguide 204B is positioned above the first waveguide 204A. Such a mating configuration ensures that when utilized in combination, i.e., when the high beam lights are activated, no void or gap is present within the light output pattern 238B.

Additionally, in one alternative embodiment not shown, positioning of the first and second waveguides 204A, 204B in such close proximity allows for the LED light source 202 to provide a common printed circuit board (PCB) including both light emitting surfaces 208 corresponding to both the input surfaces 226A of the first waveguide 204A and the input surfaces 226B of the second waveguide 204B, i.e., all LEDs 254 for the system 200 are provide a common printed circuit board (PCB). Similarly, the relative proximity of the output surfaces 228A, 228B of both waveguides 204A, 204B allows for a single common projection lens 206 to be utilized by both waveguides 204A, 204B in system 200.

In an alternative embodiment of the present invention, in the context of work lights, and for example a light mounted to exterior of a tractor cab, it may also be desirable to customize the output light pattern to avoid illuminating structural components of the vehicle, such as an exhaust pipe. In such an alternative embodiment (not shown), the configuration of the lens assembly 130, 220A, 230B in the corresponding waveguide 104, 204A, 204B, as well as the presence of asymmetrical extensions or protrusions 244A, 244B about the relative waveguide 104, 204A, 204B may provide a custom output light pattern to avoid illuminating such structural components.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A lighting system for a vehicle, comprising:

at least one LED light source adapted to be mounted to the vehicle, the at least one LED light source configured to emit a light;

at least one waveguide configured to receive the light emitted from one of the at least one LED light source at a first end and output a light pattern at an opposing second end;

the at least one waveguide having a refracting surface array disposed within a body of the waveguide between the first and second ends, the refracting surface array being arranged to configure the light received from the LED light source to form the light pattern at the second end of the waveguide; and a projection lens disposed adjected the second end of the at least one waveguide configured to receive the light pattern and project the same in front of the vehicle;

wherein the at least one waveguide comprises a first waveguide adapted to form a low beam light pattern at a headlight of the vehicle and a second waveguide adapted to form at least a portion of a high beam light pattern at the headlight of the vehicle.

2. The system of claim 1, wherein the refracting surface array comprises a void disposed within the body of the waveguide, a collector lens upstream of the void and a redistribution surface downstream of the void.

3. The system of claim 2, wherein the redistribution surface comprises a plurality of refracting surfaces.

4. The system of claim 3, wherein the plurality of refracting surfaces are generally planar.

5. The system of claim 3, wherein the at least one waveguide is formed of a polymer material having a refractive index of between 1.35 and 1.65.

6. The system of claim 3, wherein the at least one waveguide has a length of between 10.0 and 100.0 millimeters.

7. A lighting system for a vehicle, comprising:

at least one LED light source adapted to be mounted to the vehicle, the at least one LED light source configured to emit a light;

at least one waveguide configured to receive the light emitted from one of the at least one LED light source at a first end and output a light pattern at an opposing second end;

the at least one waveguide having a refracting surface array disposed within a body of the waveguide between the first and second ends, the refracting surface array being arranged to configure the light received from the LED light source to form the light pattern at the second end of the waveguide, wherein the refracting surface array comprises a void disposed within the body of the waveguide, a collector lens upstream of the void and a redistribution surface downstream of the void, wherein the redistribution surface comprises a plurality of refracting surfaces, and wherein the collector lens is a collimator; and a projection lens disposed adjected the second end of the at least one waveguide configured to receive the light pattern and project the same in front of the vehicle.

8. The system of claim 7, wherein the at least one waveguide includes an asymmetrical second end.

9. The system of claim 7, wherein the at least one LED light source comprises first and second LED light sources, and wherein the at least one waveguide comprises a first waveguide configured to receive light emitted from the first LED light source and a second waveguide configured to receive light emitted from the second LED light source.

10. The system of claim 9, wherein the first LED light source and the first waveguide are configured to emit a low beam light pattern at a headlight of a vehicle when light is emitted from the first LED light source, and wherein the second LED light source and the second waveguide are configured to emit a high beam light pattern at the headlight of the vehicle when light is emitted from the second LED light source, and wherein both the low beam light pattern and the high beam light pattern are emitted at the headlight of the vehicle when light is emitted from both the first and second LED light sources simultaneously.

11. The system of claim 10, wherein an asymmetrical surface of the first waveguide forms a mating engagement with an asymmetrical surface of the second waveguide.

12. A lighting system for a vehicle, comprising:

at least one LED light source adapted to be mounted to the vehicle, the at least one LED light source configured to emit a light;

at least one waveguide configured to receive the light emitted from one of the at least one LED light source at a first end and output a light pattern at an opposing second end;

the at least one waveguide having a refracting surface array disposed within a body of the waveguide between the first and second ends, the refracting surface array being arranged to configure the light received from the LED light source to form the light pattern at the second end of the waveguide, wherein the refracting surface array comprises a void disposed within the body of the waveguide, a collector lens upstream of the void and a redistribution surface downstream of the void, wherein the redistribution surface comprises a plurality of refracting surfaces, wherein the plurality of refracting surfaces are disposed within first and second rows of refracting surfaces; and a projection lens disposed adjected the second end of the at least one waveguide configured to receive the light pattern and project the same in front of the vehicle.

13. The system of claim 12, wherein the refracting surfaces in the first row of refracting surfaces and the refracting surfaces in the second row of refracting surfaces are differently configured relative to each other.

14. A lighting system for a vehicle, comprising:

at least one LED light source adapted to be mounted to the vehicle, the at least one LED light source configured to emit a light;

at least one waveguide configured to receive the light emitted from one of the at least one LED light source at a first end and output a light pattern at an opposing second end;

the at least one waveguide having a refracting surface array disposed within a body of the waveguide between the first and second ends, the refracting surface array being arranged to configure the light received from the LED light source to form the light pattern at the second end of the waveguide, wherein the refracting surface array comprises a void disposed within the body of the waveguide, a collector lens upstream of the void and a redistribution surface downstream of the void, wherein the redistribution surface comprises a plurality of refracting surfaces, wherein the collector lens is configured to asymmetrically distribute light about the refracting surfaces; and a projection lens disposed adjected the second end of the at least one waveguide configured to receive the light pattern and project the same in front of the vehicle.

15. A lighting system for a vehicle headlight, comprising:

a first and second LED light source adapted to be mounted to the vehicle, the first and second LED light sources each being configured to individually emit a light;

a first waveguide configured to receive the light emitted from the first LED light source at a first end and output a light pattern at an opposing second end;

the first waveguide having a refracting surface array disposed within a body of the first waveguide between the first and second ends, the refracting surface array of the first waveguide being arranged to configure the light received from the first LED light source to form a low beam light pattern at the second end of the first waveguide;

a second waveguide configured to receive the light emitted from the second LED light source at a first end and output a light pattern at an opposing second end;

the second waveguide having a refracting surface array disposed within a body of the second waveguide between the first and second ends, the refracting surface array of the second waveguide being arranged to configure the light received from the second LED light source to form a portion of a high beam light pattern at the second end of the second waveguide; and a projection lens disposed adjected the second end of the first and second waveguides configured to receive the low beam and high beam light patterns and project the same in front of the vehicle.

16. The system of claim 15, wherein the refracting surface array of the first and second waveguides each comprises a void disposed within the body of the corresponding waveguide, a collector lens upstream of the void and a redistribution surface downstream of the void.

17. The system of claim 15, wherein each collector lens is a collimator.

18. The system of claim 15, wherein the first and second waveguides are formed of a polymer material having a refractive index of between 1.35 and 1.65.

19. The system of claim 15, wherein an asymmetrical surface of the first waveguide forms a mating engagement with an asymmetrical surface of the second waveguide.

20. The system of claim 15, wherein the first LED light source and the first waveguide are configured to emit a low beam light pattern at a headlight of a vehicle when light is emitted from the first LED light source, and wherein the second LED light source and the second waveguide are configured to emit a high beam light pattern at the headlight of the vehicle when light is emitted from the second LED light source, and wherein both the low beam light pattern and the high beam light pattern are emitted at the headlight of the vehicle when light is emitted from both the first and second LED light sources simultaneously.

21. The system of claim 15, wherein the refracting surface arrays of the first and second waveguides are configured to shape the low beam and high beam light patterns projected in front of the vehicle.

* * * * *